United States Patent
Kwon et al.

(10) Patent No.: US 8,783,735 B2
(45) Date of Patent: Jul. 22, 2014

(54) CONDUCTANCE ON HYDRAULIC FITTINGS USING A SOFT METAL INTERLAYER

(75) Inventors: Eddie Kwon, Seattle, WA (US); Michael E. Rorabaugh, Seattle, WA (US); Benjamin A. Johnson, Lynnwood, WA (US); James P. Irwin, Renton, WA (US); Robert E. Fisher, Renton, WA (US)

(73) Assignee: The Boeing Company, Chicago, IL (US)

( * ) Notice: Subject to any disclaimer, the term of this patent is extended or adjusted under 35 U.S.C. 154(b) by 45 days.

(21) Appl. No.: 13/279,973

(22) Filed: Oct. 24, 2011

(65) Prior Publication Data

US 2013/0099490 A1   Apr. 25, 2013

(51) Int. Cl.
*F16L 13/14*   (2006.01)

(52) U.S. Cl.
USPC ............... 285/382.2; 29/508; 29/516; 29/520

(58) Field of Classification Search
USPC ............. 285/382.2, 382.1, 382; 29/508, 516, 29/517, 520
See application file for complete search history.

(56) References Cited

U.S. PATENT DOCUMENTS

| | | | | |
|---|---|---|---|---|
| 1,186,813 A * | 6/1916 | McFerran | ............ | 285/382.2 |
| 3,528,689 A * | 9/1970 | Roe | ............ | 285/382.2 |
| 3,529,856 A * | 9/1970 | Smith et al. | ............ | 285/382.2 |
| RE28,457 E * | 7/1975 | Dawson | ............ | 285/382.2 |
| 4,352,142 A * | 9/1982 | Olson | ............ | 361/218 |
| 4,705,302 A | 11/1987 | Beiley | | |
| 4,985,801 A | 1/1991 | Hellard et al. | | |
| 5,386,923 A * | 2/1995 | Nakashima et al. | ........ | 285/382.2 |
| 5,405,176 A | 4/1995 | Babel et al. | | |
| 5,560,661 A | 10/1996 | Babel et al. | | |
| 6,450,553 B1 * | 9/2002 | Suresh | ............ | 285/382.2 |
| 7,452,004 B2 * | 11/2008 | Hayakawa | ............ | 285/382 |
| 7,599,164 B2 * | 10/2009 | Heeter et al. | ............ | 361/218 |
| 7,898,785 B2 * | 3/2011 | Winter et al. | ............ | 361/117 |
| 2013/0020800 A1 | 1/2013 | Heraud et al. | | |

FOREIGN PATENT DOCUMENTS

FR    2955370    7/2011

OTHER PUBLICATIONS

European Search Report and Opinion, European Application No. 12188489.4 (Aug. 8, 2013).

* cited by examiner

*Primary Examiner* — David E Bochna
(74) *Attorney, Agent, or Firm* — Farid Piroozmandi

(57) ABSTRACT

A method for improving conductance on hydraulic fittings by incorporating a soft metal interlayer between the fitting and a hydraulic tube, wherein the soft metal interlayer is located in an area where the fitting engages the hydraulic tube upon swaging or installation under pressure.

21 Claims, 2 Drawing Sheets

CONDUCTANCE ON HYDRAULIC FITTINGS USING A SOFT METAL INTERLAYER

FIELD

The present patent application relates to methods for improving conductance on hydraulic fittings by incorporating a soft metal interlayer between the fitting and a hydraulic tube.

BACKGROUND

Fittings are commonly used to connect metal tubes and pipes to each other for use in a variety of applications, such as in the aerospace industry, to convey fuel, hydraulic control fluids and the like in an aircraft or space vehicle. In these applications, it is critical that there be a secure connection between the fitting and the tubes in order to withstand vibration and other adverse conditions without failure.

Various fittings have been developed in the past to connect tubes to each other. In one type of fitting, a radial swaging force is applied to the fitting and the tube, which may be done externally around the fitting or internally within the tube. In either case, the radial swaging force is applied directly to the fitting and tube by the tool. In some instances, the inner surface of the fitting has a plurality of axially spaced annular grooves or teeth by which the material of the tube is deformed by the swaging tool to make the swaged connection. In other instances, a curved or irregular configuration on the outer surface of the fitting is transferred to the inner surface of the fitting upon swaging by deforming the fitting, which causes the tube to deflect and conform to the irregular configuration and thereby make the connection.

Another type of fitting comprises a cylindrical sleeve having a tapered outer surface and a cylindrical inner surface for receiving a tube. A deforming ring surrounds the sleeve and has a tapered inner surface which matches and engages with the tapered outer surface of the sleeve. Before swaging, the deforming ring is positioned outwardly with respect to the sleeve such that no radial force is applied by the deforming ring to the sleeve. During swaging, the deforming ring is moved axially in a forward direction over the sleeve such that the interaction of the tapered surfaces on the ring and the sleeve applies a radial force deforming the sleeve and the tube inwardly to make a swaged connection between them. These fittings shall be generally referred to as axially swaged fittings.

Carbon fiber reinforced plastic ("CFRP") materials are increasingly being used in place of aluminum to form the skin panels and structural members of commercial airplanes. CFRP materials are advantageous compared to aluminum due to the higher strength-to-weight ratios provided by carbon composites. However, CFRP materials offer less EME protection to systems installed inside the structural members from lightning strikes than aluminum materials. This is attributable to the intrinsic resistance of the composite materials. As a result, the conductive systems within the fuel tank may be forced to carry more of the current induced by a lightning strike event. Native hydraulic fittings within a composite fuel tank may not always be capable of carrying the higher current from a lightning strike to a CFRP airplane without sparking. In an airplane such sparking is not permitted in the presence of flammable vapor as an ignition source, such as in the presence of fuel vapors inside a fuel tank. Therefore, the use of CFRP materials requires special considerations of the effects of lightning strikes and other electro-magnetic effects (EME). This is particularly important in the wing structure where metallic tubing for fuel transfer and hydraulic actuation pass through the fuel tank.

Current solutions include the use of isolators of short sections of tube, which can be used to interrupt the current flow while permitting fluid flow. Such isolators provide a high electrical resistance path that limits electrical current flow between two fitting connections, but allows for the gradual dissipation of electrostatic charge. However, investigation of alternative methods continues to provide additional protection against sparking and damage resulting from lightning strikes and other electromagnetic effects.

Accordingly, those skilled in the art continue to seek new techniques for avoiding damage resulting from lightning strikes.

SUMMARY

In one aspect, a method for improving conductance between a hydraulic tube and fitting by incorporating a soft metal interlayer between fitting and tube, wherein the soft metal interlayer is located in an area where the fitting engages the hydraulic tube upon swaging or installation is disclosed.

In accordance with a particular aspect, conductance on hydraulic fittings is improved by providing a hydraulic fitting having an inner surface and a hydraulic tube having an outer surface, wherein the inner surface of the fitting is adapted to extend over at least a portion of the outer surface of the tube in coaxial relationship therewith; and incorporating a soft metal interlayer between the inner surface of the fitting and the outer surface of the tube, wherein the soft metal interlayer is located in an area where the fitting engages the hydraulic tube upon swaging or installation.

In accordance with another aspect, the present application is directed to a composite fuel tank made from a carbon reinforced polymer composite material, wherein can reside flammable vapors, and having a hydraulic system installed in the tank. The hydraulic system includes a hydraulic fitting having an inner surface and a hydraulic tube having an outer surface, wherein the inner surface of the fitting is adapted to extend over at least a portion of the outer surface of the tube in coaxial relationship therewith. A soft metal interlayer is incorporated between the inner surface of the fitting and the outer surface of the tube, wherein the soft metal interlayer is located in an area where the fitting engages the hydraulic tube upon swaging or installation. As connected in accordance with certain embodiments, the hydraulic system does not have isolators and permits the induced lightning current to flow in the tube ("lightning induced tube current"). An intent of the soft metal interlayer is to enhance electrical conductivity between fitting and tube and thereby inhibit arcing and/or sparking during the transfers of induced lightning current through the joint in the tubing to prevent the creation of an ignition source inside the fuel tank.

Other aspects of the disclosed methods for minimizing the effects of lightning strikes will become apparent from the following description, the accompanying drawings and the appended claims.

DETAILED DESCRIPTION

In accordance with one aspect, the present application is directed to a method for improving conductance on hydraulic fittings by incorporating a soft metal interlayer between the fitting and a hydraulic tube. In accordance with particular embodiments, the soft metal interlayer is located in an area where the fitting engages the hydraulic tube upon swaging or installation under pressure.

In accordance with another aspect, the present application is directed to a method for improving conductance on hydraulic fittings by providing a hydraulic fitting having an inner surface and a hydraulic tube having an outer surface, wherein the inner surface of the fitting is adapted to extend over at least a portion of the outer surface of the tube in coaxial relationship therewith; and incorporating a soft metal interlayer between the inner surface of the fitting and the outer surface of the tube, wherein the soft metal interlayer is located in an area where the fitting engages the hydraulic tube upon swaging or installation under pressure.

The methods described herein are particularly useful when used in conjunction with hydraulic fittings in fuel tanks made of composite materials. As is known to those skilled in the art, a "composite" structure comprises a plurality of layers of a structural fabric within a resin matrix. Carbon fiber reinforced polymer (CFRP) materials are one example of appropriate composite structures. The fibers in CFRP are somewhat conductive, but not nearly as conductive as aluminum. Due to the intrinsic resistance of composite materials as compared to aluminum, the threat of direct and indirect lightning effects in a CFRP fuel tank is greatly increased relative to that in an aluminum tank. As a result, the conductive systems within a CFRP fuel tank may be forced to carry a larger share of the current inducted by a lightning strike event. Native hydraulic fittings within a composite fuel tank are not always capable of carrying the larger lightning current threats without sparking or igniting fuel. The incorporation of a thin soft metal interlayer into hydraulic fittings can improve conduction through native fittings and inhibit arcing and/or sparking in the tube to fitting connections, enabling a usage of the fittings in a composite fuel tank to carry current in a lightning strike without the need for in-line isolators. Furthermore, the incorporation of the thin soft metal interlayer into hydraulic fittings facilitates the development of a system that will be compliant with FAR 25.981.

Figure 1:
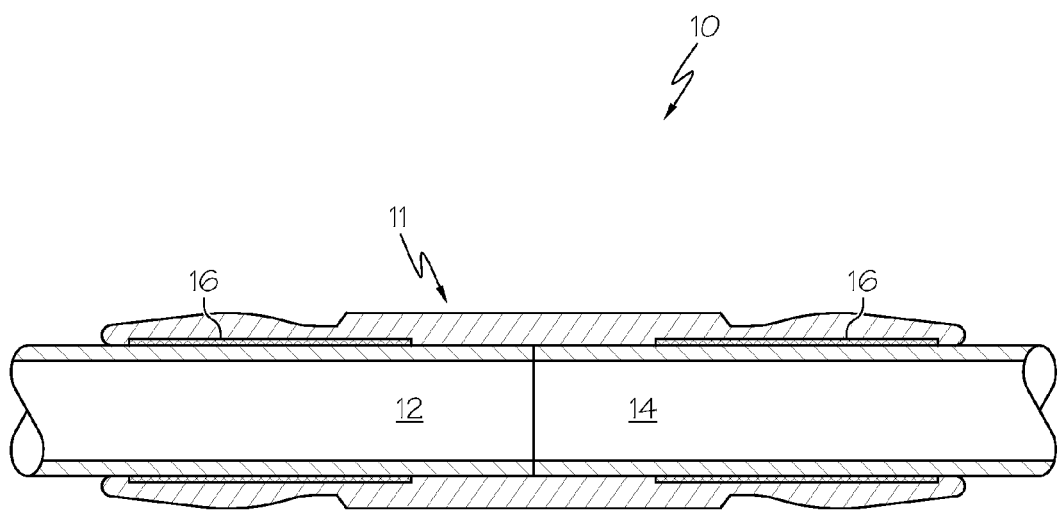
FIG. 1 is a partial sectional view of a radial swaged in-line hydraulic fitting in accordance with one aspect of the present application.

FIG. 1 is a partial sectional view of a radial swaged in-line hydraulic fitting 10 in accordance with one aspect of the present application. The hydraulic fitting 10 may be used to join two tubes 12 and 14 which are axially aligned with respect to one another and define a fluid passage. The tubes 12 and 14 may be formed of titanium or any other metal tube material. The hydraulic fitting 10 may be formed of titanium or any other hard metal material conventional for a fitting. The fitting is mounted to tubes 12 and 14, and bridges the confronting ends of the adjacent tubes 12 and 14.

Fitting 10 is of a generally cylindrical geometry that fits over the ends of tubes 12 and 14, bridging those sections of the fluid line. The fitting is mounded at each end with tapers on each side of mound to provide sections at each end of the fitting that are of reduced outer diameter. In simple terms, when swaged, the mounds are compressed by the swaging tool into the tube forming depressions that lock the tube in place. Either the inside diameter of fitting 10 or the outside diameter of tubes 12 and 14 carries a thin soft metal coating interlayer 16, which is applied by any conventional technique, suitably by a standard plating processes. The thin metal interlayer 16 is represented by the thick solid black line.

Figure 2A:
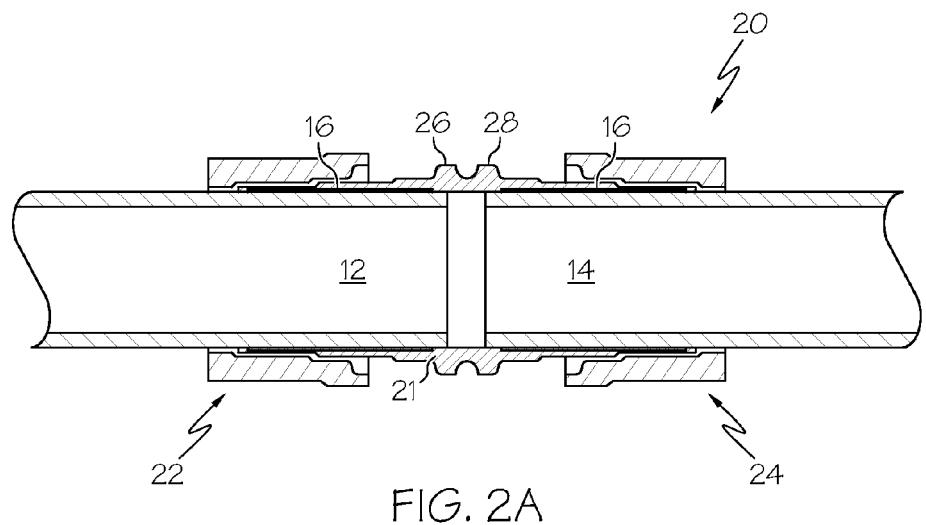
FIG. 2A is a partial sectional view of an axial swaged in-line hydraulic fitting in accordance with one aspect of the present application prior to swaging.
Figure 2B:
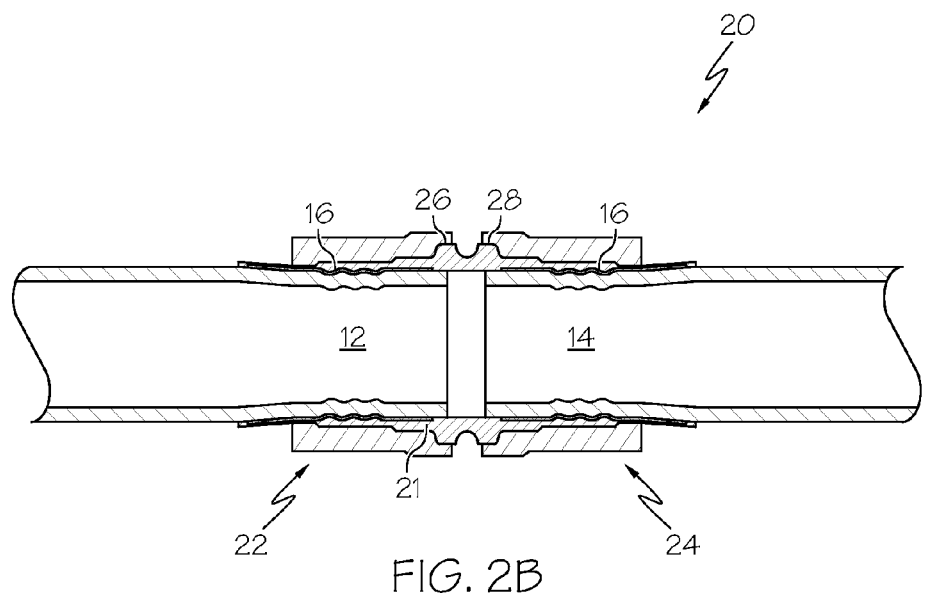
FIG. 2B is a partial sectional view of an axial swaged in-line hydraulic fitting in accordance with one aspect of the present application following swaging.

FIG. 2A is a partial sectional view of an axial swaged in-line hydraulic fitting 20 prior to swaging in accordance with another aspect of the present application. FIG. 2B is a partial sectional view of an axial swaged in-line hydraulic fitting 20 following swaging. The hydraulic fitting 20 may be used to join two tubes 12 and 14 which are axially aligned with respect to one another and define a fluid passage. The fitting 20 includes a fitting body 21 and also contains a pair of clamp rings 22 and 24, which are of conventional structure and function. Each ring is also generally cylindrical in shape, containing an internal generally cylindrical geometry that initially fits over the tube and engages expanded diameter portions 26 and 28 on fitting body 21. In simple terms, when swaged, the expanded portions of the body are compressed by the rings into the tube forming depressions that lock the tube in place as shown in FIG. 2B. The hydraulic fitting 20 may be formed of titanium or any other hard metal material conventional for a fitting. The fitting is mounted to tubes 12 and 14, and bridges the confronting ends of the adjacent tubes 12 and 14.

A thin metal interlayer 16 is interposed between the fitting body 21 and the tubes 12 and 14. Either the inside diameter of fitting body 21 or the outside diameter of tubes 12 and 14 carries a thin soft metal coating interlayer 16, which is applied by any conventional technique, suitably by a standard plating processes. The thin metal interlayer 16 is represented by the thick solid black line.

The connection between the fitting and tube is formed in a mechanical swaging process, a known technique. In accordance with one embodiment, the outer surface of the tube may be plated with the soft metal. That same soft metal may also be plated on the inside of the swage fitting. Thereafter, for swaging, the fitting is placed on the tube overlying the plating Swaging places a radial or axial compressive squeezing force on the fitting that reduces the diameter of its inner surface pressing it against the intermediate layer and there through onto the tube. Hence when the compressive swaging force is withdrawn, the fitting retains its new shape pressed tightly onto the tube and the two tubes remain permanently joined. For radial swage, the fitting is compressed or swaged directly onto the tube by a swaging tool. For axial swage, each fitting ring is mounted on the tube, the fitting body is placed over the tube ends and the rings are then moved longitudinally by a tool along the axis of the tubes to the position overlying a portion of the fitting body. Then the fitting is compressed or swaged by the rings onto the tube, resulting in a frictional fit therebetween.

Following swaging, the soft thin metal interlayer 16 is deformed as is as a portion of the tube. Since the intermediate metal layer is softer in physical characteristic than either the tube or fitting, portions of that soft metal layer are flowed or moved into any vacant areas, interstitial space, scratches, pores, however slight, as may be found to exist between the fitting and tube thereby improving the conductance of the fitting.

The thin soft metal coating may be applied in two parts, one of which is applied onto the outer surface of the tube and the other of which is applied onto the inner surface of the fitting to the same effect.

The soft metal used to form the interlayer 16 may be selected from the group consisting of aluminum, copper, gallium, silver, cadmium, gold, antimony, platinum, tin, indium, rhodium, thallium, bismuth, lead, alloys thereof, and certain steel alloys. In accordance with certain embodiments, the soft metal interlayer may be from about 0.000002 to about 0.015 inches, more particularly from about 0.000010 to about 0.000050, and in some cases from about 0.001 to about 0.010 inches thick.

The improved fittings described herein can be used in tube connections to in-line fittings (radial swaged, axial swaged, cryogenic) and bulkhead fittings in 3000/5000 psi systems, etc. In accordance with certain embodiments, the methods described herein may be utilized in composite structures useful in assembly of aircraft. Sparking is very dangerous in sections of the aircraft containing fuel. FAA regulations require control of ignition sources (including sparking due to lightning or static charge buildup) in fuel tanks. The prevailing regulatory standard can require up to three independent protective features to prevent ignition source. The methods described herein provide for fittings with increased conductance between the fitting and tubing to provide at least on protective feature against sparking as an ignition source and the potential damage associated therewith.

Described herein is an improved fitting, which is particularly useful in aircraft, and which is constructed to protect a structure from lightning strikes and the like. Although the embodiments described herein are directed towards components used in aircraft, the aspects of the present application may be applied to other structures such as automobiles, boats, etc.

Although various aspects of the disclosed fittings and associated methods for minimizing the effects of lightning strikes have been shown and described, modifications may occur to those skilled in the art upon reading the specification. The present application includes such modifications and is limited only by the scope of the claims.

What is claimed is:

1. A method for improving electrical conductance on a hydraulic fitting in need thereof comprising:
    providing a hydraulic fitting having an inner surface and a hydraulic tube having an outer surface, wherein the inner surface of the fitting is adapted to extend over at least a portion of the outer surface of the tube in coaxial relationship therewith; and
    incorporating a soft metal interlayer between the inner surface of the fitting and the outer surface of the tube, wherein the soft metal interlayer is located in an area where the fitting engages the hydraulic tube upon swaging or installation under pressure and wherein the soft metal interlayer is about 0.001 to about 0.010 inches thick.

2. The method of claim 1 wherein said soft metal is selected from the group consisting of aluminum, copper, gallium, silver, cadmium, gold, antimony, platinum, tin, indium, rhodium, thallium, bismuth, lead, alloys thereof, and steel alloys.

3. The method of claim 1 wherein said soft metal interlayer is present on the inner surface of the fitting.

4. The method of claim 1 wherein said soft metal interlayer is present on the outer surface of the tube.

5. The method of claim 1 further comprising swaging the fitting and tube to bring the inner surface of the fitting and the outer surface of the tube into engagement and electrical contact through the soft metal interlayer.

6. The method of claim 1 wherein said swaging comprises radial swaging or axial swaging.

7. The method according to claim 1 further comprising providing a second hydraulic tube with a second outer surface, wherein the inner surface of the fitting is adapted to extend over at least a portion of the second outer surface of the second hydraulic tube in coaxial relationship therewith;
    incorporating a second soft metal interlayer between the inner surface of the fitting and the second outer surface of the second hydraulic tube, wherein the second soft metal interlayer is located in an area where the fitting engages the second hydraulic tube upon swaging or installation under pressure, and wherein the second soft metal interlayer is about 0.001 to about 0.010 inches thick; and
    wherein the hydraulic fitting joins the hydraulic tube and the second hydraulic tube in axial alignment with respect to one another to define a fluid passage.

8. A method for providing protection against sparking as a protective feature in preventing an ignition source in a composite fuel tank in need thereof comprising:
    providing a composite fuel tank comprising;
    a carbon reinforced polymer material and
    a hydraulic system, wherein the hydraulic system includes a hydraulic fitting having an inner surface and a hydraulic tube having an outer surface, wherein the inner surface of the fitting is adapted to extend over at least a portion of the outer surface of the tube in coaxial relationship therewith; and a soft metal interlayer is incorporated between the inner surface of the fitting and the outer surface of the tube, wherein the soft metal interlayer is located in an area where the fitting engages the hydraulic tube upon swaging or installation under pressure, and wherein the soft metal interlayer is about 0.001 to about 0.010 inches thick.

9. The method of claim 8 wherein said soft metal is selected from the group consisting of aluminum, copper, gallium, silver, cadmium, gold, antimony, platinum, tin, indium, rhodium, thallium, bismuth, lead, alloys thereof, and steel alloys.

10. The method of claim 8 wherein said soft metal interlayer is present on the inner surface of the fitting.

11. The method of claim 8 wherein said soft metal interlayer is present on the outer surface of the tube.

12. The method of claim 8 further comprising swaging the fitting and tube to bring the inner surface of the fitting and the outer surface of the tube into engagement under pressure and electrical contact through the soft metal interlayer.

13. The method of claim 8 wherein said swaging comprises radial swaging or axial swaging.

14. The method of claim 8 wherein said composite fuel tank is part of an aircraft.

15. The method of claim 8 wherein said swaging with said soft metal interlayer enhances electrical contact between the fitting and tube compared to a fitting and tube without the interlayer.

16. The method according to claim 8 wherein the hydraulic system further comprises
    a second hydraulic tube with a second outer surface, wherein the inner surface of the hydraulic fitting is adapted to extend over at least a portion of the second outer surface of the second hydraulic tube in coaxial relationship therewith;
    a second soft metal interlayer between the inner surface of the hydraulic fitting and the second outer surface of the second hydraulic tube, wherein the second soft metal interlayer is located in an area where the hydraulic fitting engages the second hydraulic tube upon swaging or installation under pressure, and wherein the second soft metal interlayer is about 0.001 to about 0.010 inches thick; and wherein the hydraulic fitting joins the hydraulic tube and the second hydraulic tube in axial alignment with respect to one another to define a fluid passage.

17. A hydraulic system, wherein the hydraulic system comprises:
a hydraulic fitting having an inner surface; and
a hydraulic tube having an outer surface, wherein the inner surface of the fitting is adapted to extend over at least a portion of the outer surface of the tube in coaxial relationship therewith; and a soft metal interlayer is incorporated between the inner surface of the fitting and the at least a portion of the outer surface of the tube, and wherein the soft metal interlayer is about 0.001 to about 0.010 inches thick.

18. The hydraulic system according to claim 17 comprising a second hydraulic tube having a second outer surface, wherein the inner surface of the hydraulic fitting is adapted to extend over at least a portion of the second outer surface of the second hydraulic tube in coaxial relationship therewith; and a second soft metal interlayer is incorporated between the inner surface of the hydraulic fitting and the at least a portion of the second outer surface of the second hydraulic tube, and wherein the second soft metal interlayer is about 0.001 to about 0.010 inches thick, wherein the hydraulic fitting joins the hydraulic tube and the second hydraulic tube in axial alignment with respect to one another to define a fluid passage.

19. The hydraulic system according to claim 18 wherein the soft metal interlayer and second soft metal interlayer are located in an area where the hydraulic fitting engages the hydraulic tube and second hydraulic tube upon swaging or installation under pressure.

20. The hydraulic system according to claim 18 wherein the hydraulic fitting inner surface carries the soft metal interlayer and/or the second soft metal interlayer.

21. The hydraulic system according to claim 18 wherein the at least a portion of the outer surface of the tube carries the soft metal interlayer and/or the at least a portion of the second outer surface of the second hydraulic tube carries the second soft metal interlayer.

* * * * *